(12) United States Patent
Ben-Ezra et al.

(10) Patent No.: US 7,974,498 B2
(45) Date of Patent: Jul. 5, 2011

(54) SUPER-RESOLUTION IN PERIODIC AND APERIODIC PIXEL IMAGING

(75) Inventors: Moshe Ben-Ezra, Jerusalem (IL);
Zhouchen Lin, Beijing (CN); Bennett Wilburn, Vienna, VA (US)

(73) Assignee: Microsoft Corporation, Redmond, WA (US)

( * ) Notice: Subject to any disclaimer, the term of this patent is extended or adjusted under 35 U.S.C. 154(b) by 982 days.

(21) Appl. No.: 11/835,625

(22) Filed: Aug. 8, 2007

(65) Prior Publication Data

US 2009/0046952 A1    Feb. 19, 2009

(51) Int. Cl.
*G06K 9/32* (2006.01)
(52) U.S. Cl. ....................................................... 382/299
(58) Field of Classification Search .................. 382/299, 382/300, 312, 318
See application file for complete search history.

(56) References Cited

U.S. PATENT DOCUMENTS

| | | | |
|---|---|---|---|
| 6,459,823 B2 * | 10/2002 | Altunbasak et al. .......... | 382/299 |
| 6,664,955 B1 | 12/2003 | Deering | |
| 6,665,012 B1 | 12/2003 | Yang et al. | |
| 6,700,680 B2 | 3/2004 | Toyoda et al. | |
| 6,950,109 B2 | 9/2005 | Deering | |
| 7,239,428 B2 | 7/2007 | Solecki | |
| 7,248,271 B2 | 7/2007 | Credelle et al. | |
| 7,358,929 B2 * | 4/2008 | Mueller et al. ................. | 345/1.3 |
| 2005/0152005 A1 | 7/2005 | Damera-Venkata | |
| 2006/0159369 A1 | 7/2006 | Young | |
| 2007/0064976 A1 | 3/2007 | England, III | |
| 2007/0133903 A1 | 6/2007 | Zomet et al. | |
| 2008/0138604 A1 * | 6/2008 | Kenney et al. ................. | 428/323 |

FOREIGN PATENT DOCUMENTS

EP    998122 A2    5/2000

OTHER PUBLICATIONS

Aly, "Regularized Image Up-sampling", Mar. 2004, Hussein A Aly, 2004, pp. 179.
Malioutov, "A Sparse Signal Reconstruction Perspective for Source Localization with Sensor Arrays", Jul. 2003, Massachusetts Institute of Technology, 2003, pp. 1-172 .
Lin, et al., "Fundamental Limits of Reconstruction-Based Super-resolution Algorithms under Local Translation", IEEE Transactions on Pattern Analysis and Machine Intelligence, vol. 26, No. 1, Jan. 2004, IEEE, 2004, pp. 1-15.
International Search Report, mailed Dec. 23, 2008, 11 pages.
Sung C. Park, et al., "Super-resolution image reconstruction: a technical overview", IEEE Signal Processing Magazine, May 2003, pp. 21-36, vol. 20, No. 3.

(Continued)

*Primary Examiner* — Yon Couso
(74) *Attorney, Agent, or Firm* — L. Alan Collins; Collins & Collins Incorporated

(57) ABSTRACT

A super-resolution algorithm that explicitly and exactly models the detector pixel shape, size, location, and gaps for periodic and aperiodic tilings. The algorithm projects the low-resolution input image into high-resolution space to model the actual shapes and/or gaps of the detector pixels. By using an aperiodic pixel layout such as a Penrose tiling significant improvements in super-resolution results can be obtained. An error back-projection super-resolution algorithm makes use of the exact detector model in its back projection operator for better accuracy. Theoretically, the aperiodic detector can be based on CCD (charge-coupled device) technology, and/or more practically, CMOS (complimentary metal oxide semi-conductor) technology, for example.

19 Claims, 10 Drawing Sheets

OTHER PUBLICATIONS

B.E. Burke, et al., "640×480 back-illuminated CCD imager with improved blooming control for night vision", Electron Devices Meeting, 1998. IEDM '98 Technical Digest., International, Dec. 6-9, 1998, pp. 33-36, San Francisco, CA.

Allis, et al., Chaos and Graphics, "Visualizing point sets, fractals, and quasicrystals using raster techniques", Computers and Graphics, Jun. 2001, pp. 519-527, vol. 25, Issue 3.

* cited by examiner

SUPER-RESOLUTION IN PERIODIC AND APERIODIC PIXEL IMAGING

BACKGROUND

Enormous resources continue to be expended toward advances in image capture and processing to find better ways of increasing image resolution. However, there remains a significant technological gap between theoretical optical resolution limits and current sensor resolutions, particularly for short wavelengths (e.g., 380-400 nm). This is due in part to the need in device fabrication technology to increase the number of devices in a given space and then route signals to and from these devices using lead lines, both of which are becoming increasingly problematic. Thus, digital sensor resolution is limited by the physical size of the photosensing elements (or pixels) that can be manufactured.

A computational technique called super-resolution can be used to increase the resolution beyond the physical limit. Super-resolution can produce images of a higher resolution than the resolution of the originally captured image. One category of super-resolution algorithms includes reconstruction-based algorithms (RBAs) which are the most commonly-used algorithms for super-resolution. RBAs model the process of image formation to build a relation between a low-resolution image (LRI) and a high-resolution image (HRI). RBAs rely on the relationship between the LRIs and the HRI, and assume various kinds of prior conditions on the HRI in order to regularize the framework in preparation for the complex and ill-posed inverse problem.

The RBA usually first forms a linear system $$L = PH + E,$$

where L is the column vector of the irradiance of all low-resolution pixels (LRPs) considered, H is the vector of the irradiance of the HRI, P gives the weights of the high-resolution pixels (HRPs) in order to obtain the irradiance of the corresponding LRPs, and E is the noise. In all previous work, the LRPs appear on the left-hand side of the equation and the LRIs are all rectangular regular grids with square pixels, the regular layout. Based on such a configuration, both practice and theoretical analysis have shown that the magnification factor is limited to a relatively small number.

Moreover, conventional research in super-resolution has raised significant doubts regarding the usability of RBAs in super-resolution in the real world for the regular layout. For example, when the magnification factor becomes large, performance of the RBA deteriorates. Accordingly, different approaches to resolution enhancement should be taken in order to overcome these limitations.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a new approach to super-resolution that explicitly models the detector pixel shape, position, and element gaps. This is performed in high-resolution space (e.g., using a high-resolution grid) by modeling the actual shapes and/or gaps of the pixels. The algorithm can be applied to arbitrary pixel shapes, sizes, and combinations thereof, as well as periodic or aperiodic layouts. By using an aperiodic pixel layout significant improvements in super-resolution results can be obtained. In one particular aperiodic application Penrose rhombus tiling can be employed. Based on the capability to employ and process aperiodic tilings, layouts similar to a biological retina could, theoretically, also be employed although fabrication may still be a challenge.

The architecture also presents a new variation of an error-back projection super-resolution algorithm that makes use of the exact detector model in its back projection operator for better accuracy.

The aperiodic detector can be based on CCD (charge-coupled device) and/or CMOS (complimentary metal oxide semiconductor) technology, for example, with CMOS being the more practical technology.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
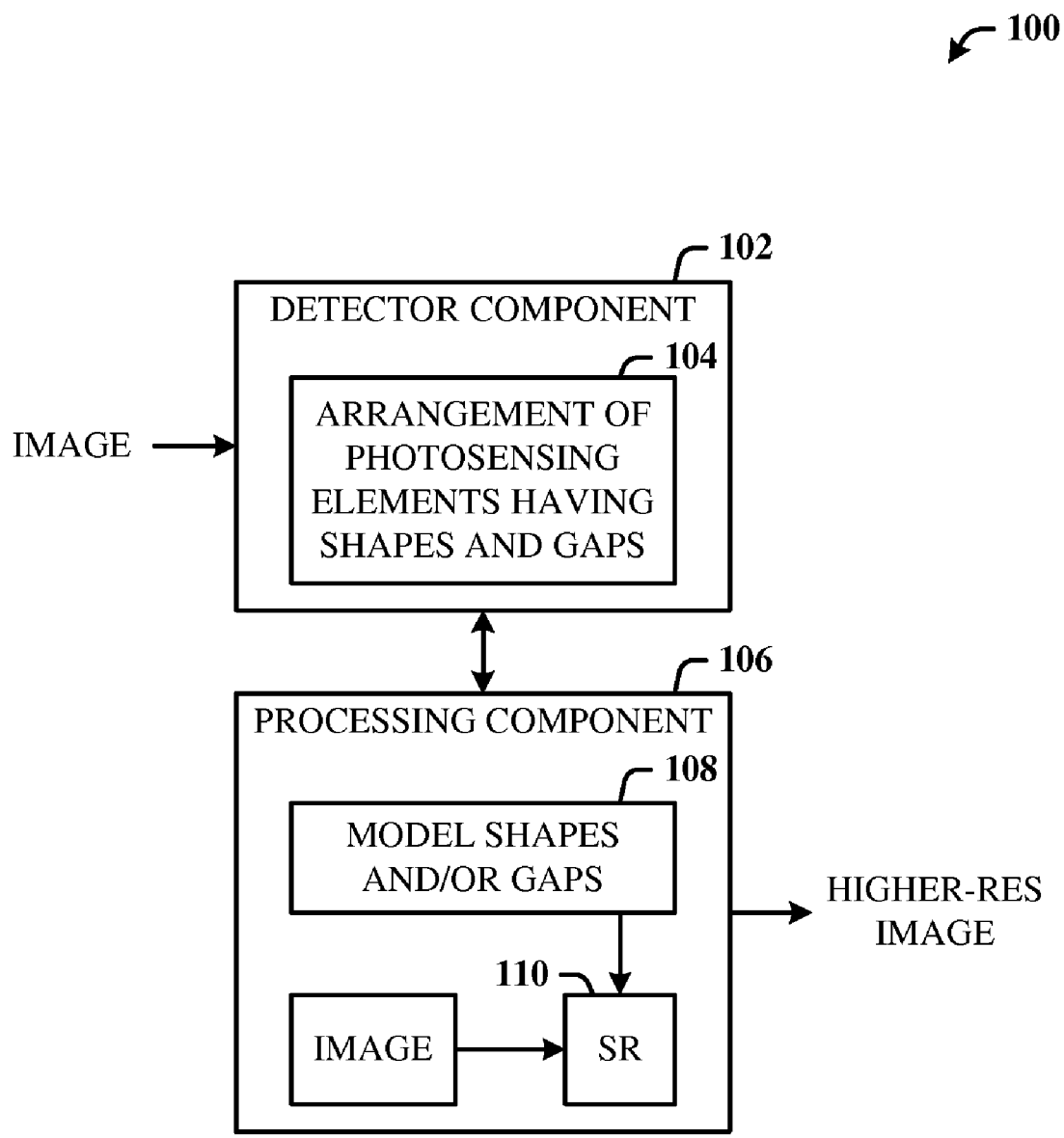
FIG. 1 illustrates an image processing system in accordance with the disclosed architecture.

The disclosed architecture is a novel approach to super-resolution based on aperiodic Penrose tiling and a novel back-projection super-resolution algorithm. This approach significantly enhances the capability of reconstruction-based algorithms (RBAs) for super-resolution processing, and reduces the gap between the optical resolution limitations and the sensor resolution limitations. Constructing a physical Penrose tiling sensor can be feasible with current technology. Such sensors can prove very beneficial for demanding imaging applications such as microscopy and astronomy. Another application is adapting current image stabilization jitter mechanisms for use with super-resolution. For example, even a modest 4× linear magnification turns an 8 MP (megapixel) camera into a 128 MP camera for stationary and moving scenes without changing the field of view.

A new variant of error back-projection super-resolution algorithm is also provided that makes use of the exact detector model in its back projection operator for better accuracy.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates an image detection system 100 in accordance with the disclosed architecture. The system 100 includes a detector component 102 having an arrangement 104 of photosensing elements (e.g., pixels) for sensing an image, the arrangement 104 defined by element shapes, position, and/or gaps between the elements. The system 100 also includes a processing component 106 for creating a higher-resolution representation of the image based on an explicit model 108 of the element shapes and/or the gaps during a super-resolution process 110. The disclosed approach to RBA super-resolution explicitly models the detector pixel layout. Thus, pixels can vary in shape, size, and there may be gaps between adjacent pixels. Furthermore, pixel layout can be periodic as well as aperiodic, such as in a Penrose tiling or a biological retina.

Figure 2:
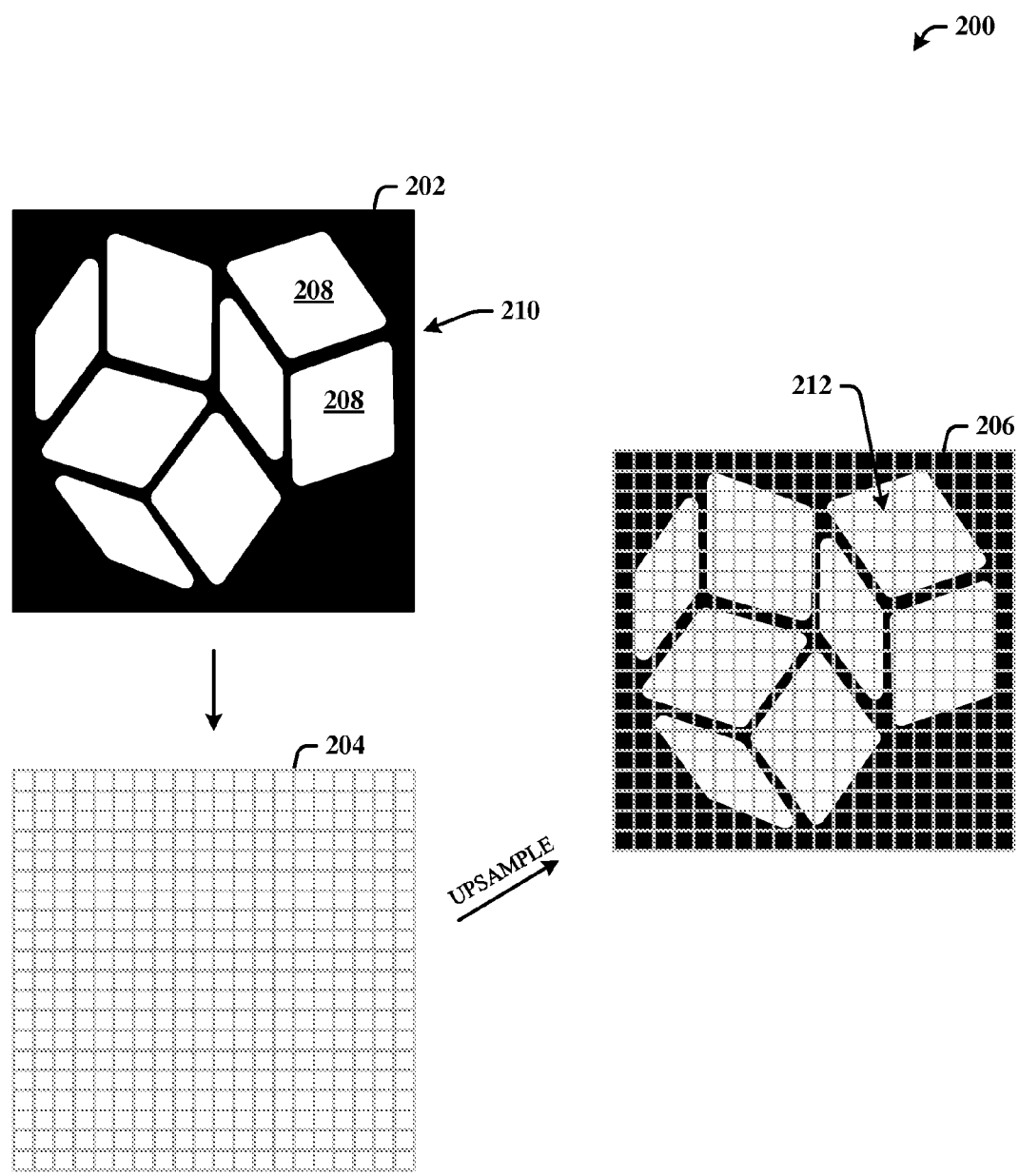
FIG. 2 illustrates an exemplary implementation of upsampling an aperiodic image using a high-resolution grid.

FIG. 2 illustrates a method 200 of upsampling an aperiodic low-resolution image (LRI) 202 using a high-resolution grid 204. As previously described RBAs are the most commonly-used algorithms for super-resolution. RBAs model the process of image formation to build a relation between the LRI 202 and a high-resolution image (HRI) 206. RBAs rely on the relationship between the LRI and the HRI, and assume various kinds of conditions on the HRI in order to regularize this problem.

The magnification factor can be much larger by upsampling the LRI 202 using the high-resolution grid 204 to match the detector layout in high-resolution space, shown as the same arrangement of pixels in the HRI 206 as in the LRI 202. Additionally, rather than using a regular pixel grid for the LRI 202, an irregular pixel layout for the detector is employed, resulting in an LRI 202 with irregular pixel shapes. The irregular layout produces a more independent equation set. Moreover, since the layout has no translational symmetry larger displacements (multiples of half a pixel) between LRIs can be used without having the grid repeat itself. This enables computation of the HRI 206 with larger magnifications, in contrast with regular grids where the effective displacement is modulo pixel size, which limits the number of different displacements that are at least 1/M pixel apart, where M is the linear magnification factor).

Additionally, the element layout (or arrangement), either regular or irregular, does not require that the low-resolution pixels (LRPs) 208 in the LRI 202 fill the whole detector plane. The gaps between physical pixels are specifically modeled as null values, which better match the information that is really acquired by the detector. In contrast, a sharp edge at the gap between pixels in a conventional model will be wrongly assumed to not exist.

Penrose tiling is an aperiodic tiling of the plane. FIG. 2 shows rhombus-type Penrose tiling in the LRI 202, which consists of two rhombuses, each placed at five different orientations according to specific rules. The ratio of the number of thick to thin rhombi is the Golden Number $$\frac{1+\sqrt{5}}{2},$$

which is also the ratio of the areas. Unlike regular tiling, Penrose tiling has no translational symmetry (it never repeats itself exactly on the infinite plane. However, any finite portion of the Penrose tiling can repeat infinitely many times. For the purpose of super-resolution, this means that it is theoretically possible to integrate and sample the infinite plane indefinitely without repeating the same pixel structure.

In practice, this allows the capture of significantly larger number of different images than is possible with a regular grid. Moreover, all images can be optimally displaced approximately half a pixel apart and still be different. The rhombus Penrose tiling shown in FIG. 2 is a good candidate for hardware color sensor realization because it is 3-colorable (red, green, blue-RGB) and has simple tiles.

A goal is to obtain the best possible results for real photographic systems. It is assumed that the motion of the camera is translational on a plane parallel to the detector plane. It is also assumed that the images are captured (or otherwise selected) in a controlled manner such that the displacements are equal in both the horizontal and the vertical directions and are exactly 1/M apart, where M is the linear magnification factor.

The meaning of the magnification factor for irregular pixel layouts is ambiguous. However, focusing on quasi-uniform pixel layouts, the magnification factor can still be estimated as the increase in the number of pixels. The shape of the LRPs 208 can also be different from each other and gaps 210 between the pixels 208 are allowed.

It is further assumed that the pixels 208 of the detector have uniform photosensitivity, which implies that the contribution of a high-resolution pixel (HRP) 212 to an LRP 208 is proportional to the HRP area inside the LRP, and vice versa. These assumptions greatly simplify the model and implementation; however, it can be shown that these assumptions can be relaxed.

In the disclosed approach, the LRPs 208 in each LRI 202 are not aligned on a regular grid. Nonetheless, each LRP 208 can be indexed in the LRI 202, since full knowledge exists of the pixel layout. As soon as the LRI 202 is captured, the LRI 202 is upsampled to high-resolution space using the high-resolution grid 204 to create the HRI 206, also referred to as the intermediate HRI 206. It is the intermediate HRI 206 (not the original LRI 202) that is involved in the further computations that follow.

Note that in this description, the intermediate HRI 206 is described over the group of eight pixels (or photosensitive elements) 208 and pixel gaps 210 of the LRI 202. However, it is to be understood that the description can be on a per pixel basis, and the corresponding HRI is then associated with the plurality of HRPs 212 that cover a single LRP 208.

Upsampling is performed by placing the regular high-resolution grid 204 over the actual shape(s) of the LRPs 208 (shown as the white areas), and then assigning (or mapping) the value of the LRP 208 to each of the HRPs 212 that overlap all or to some extent of the LRP 208. HRPs 212 that (mostly) cover black areas (non-photosensitive areas) are assigned a null value for differentiation from the value zero. Downsampling is an inverse procedure that integrates the non-null HRP values 212 to form the value of its underlying LRP 208. Resampling is the composition of downsampling and upsampling. In other words, the general mathematical operators are a fixed function with support function equal to one at the pixel area for the upsampling and integration (by one or more conventional methods) for the downsampling.

The assumption on the uniformity of the pixels can be relaxed at this stage by multiplying the intermediate HRI with a weight mask to compensate for intra-pixel non-uniformities. Assuming that the motion is front-parallel translational, and that the displacements between images equal 1/M, the registration of the intermediate HRI is simply an integer shift of the origin. If the motion assumptions do not hold, an additional warping step can be performed after the upsampling. The upsample operator is denoted by $\uparrow_{T_i,G}$, where $T_i$ is the transformation for registration and G is the sensor layout map.

The disclosed novel algorithm also includes an error back-projection procedure that utilizes a resampling operator denoted by $\downarrow_{T_i,G}$, which simulates the image formation process to produce new intermediate HRIs 206 given an estimate of the super-resolved image. The resampling operator can be viewed as a downsampling operator followed by an upsampling operator. In practice, the computation is done "in-place", and no actual downsizing takes place. The resulting images are hypotheses of the intermediate HRIs 206 assuming the super-resolved image is the correct one.

The disclosed super-resolution algorithm is a variant of a conventional error back-projection super-resolution algorithm. Unlike the traditional algorithm that downsamples the HRIs 206 into low-resolution space, the disclosed variant is performed entirely in the high-resolution space (e.g., grid). Using the concepts previously described, the algorithm can be summarized as follows:

Algorithm 1
Inputs:
  $Lo_1, \ldots, Lo_{M^2}$: Low resolution images (~$N^2$ pixels)
  $T_1, \ldots, T_{M^2}$: Transformations for registering the LRIs.
  M ∈ N: Magnification factor.
  G: Sensor layout map.
Output:
  Su: Super-Resolved image (NM×NM).
Processing:
  1. Upsample: $I_i = Lo_i \uparrow_{T_i,G}$, $i \in [1, \ldots, M^2]$.
  2. Initialize:

$$Su^0 = \frac{1}{M^2} \sum_{i=1}^{M^2} I_i$$

3. Iterate until convergence:

$$a.\ Su^{n+1} = Su^n + \frac{1}{M^2} \sum_{i=1}^{M^2} (I_i - Su^n \downarrow_{T_i,G}).$$

b. Limit: $0 \leq Su^n(x, y) \leq MaxVal$.

Note that null elements are ignored when computing the average values. Step 3(b) represents the prior knowledge about a physically plausible image, where MaxVal is determined by the optical blur and the analog-to-digital (A/D) converter unit.

A difference between the disclosed algorithm and the conventional back-projection algorithm (with rect kernel) lies in the upsample stage. The upsample operator $\uparrow_{T,G}$ preserves sharp edges between pixels at the high-resolution grid 204 whereas the conventional algorithm applies the blur kernel globally. Hence, the upsampling operator better preserves the high frequencies in the HRI 206.

From the linearity of the upsampling and the resampling operators in Algorithm 1, it can be seen that each intermediate HRI 206 (also denoted as $I_i$) aligned to the high-resolution grid 204 is connected to the groundtruth (or low-resolution) image Su via a matrix $A_i$:

$$I_i = A_i \cdot Su + n_i,$$

where $n_i$ is the noise from $Lo_i$. The matrix $A_i$ is exactly the representation of the resampling operator $\downarrow_{T_i,G}$ in Algorithm 1. Therefore, the iteration 3(a) in Algorithm 1 can be written as:

$$Su^{n+1} = Su^n + \frac{1}{M^2} \sum_{i=1}^{M^2} (A_i \cdot Su + n_i - A_i \cdot Su^n),$$

which further can be rewritten as:

$$Su^{n+1} - Su = (I - \overline{A})(Su^n - Su) + \overline{n},$$

where $$\overline{A} = \frac{1}{M^2} \sum_{i=1}^{M^2} A_i \text{ and } \overline{n} = \frac{1}{m^2} \sum_{i=1}^{M^2} n_i.$$

So, $$Su^n - Su = (I - \overline{A})^n (Su^0 - Su) + \left[ \sum_{k=0}^{n} (I - \overline{A})^k \right] \overline{n}.$$

Assuming that the spectral radius of $I - \overline{A}$ is less than 1, then $$\lim_{n \to \infty} (I - \overline{A})^n = 0$$

and $\overline{A}$ is non-singular with $$\overline{A}^{-1} = \sum_{k=0}^{\infty} (I - \overline{A})^k.$$

Then from above, it can be written that:

$$\lim_{n \to \infty} Su^n = Su + \overline{A}^{-1} \overline{n}.$$

From above, the iterations can be expected to result in a super-resolved image which deviates from the groundtruth image 202 by $\overline{A}^{-1} \overline{n}$. Note that $\overline{n}$ can be viewed as the empirical estimation of the mean of the noise. Therefore, when the noise in the LRIs is of zero mean (so is $n_i$ as there is a linear transform between the LRIs), it can be expected that a high fidelity super-resolved image is computed. By choosing an appropriate pixel layout so that the norm of $\overline{A}^{-1}$ is small, then the deviation can be effectively controlled regardless of the mean of the noise. (Note that $$\left\| \lim_{n \to \infty} Su^n - Su \right\| = \left\| \overline{A}^{-1} \overline{n} \right\| \leq \left\| \overline{A}^{-1} \right\| \|\overline{n}\| ).$$

As $\|\overline{A}^{-1}\|$ is large when $\overline{A}$ is close to being singular, an appropriate detector's pixel layout should be chosen such that $\overline{A}$ is far from singular.

According to the above analysis, pixel layouts are chosen such that there are more linearly independent equations in the system. The traditional regular tiling repeats itself after a translation of one LRP (two LRPs if accounting for the Bayer pattern in color sensors). One study shows that if five LRPs cover the same set of HRPs, then the equation set must be linearly dependent. These indicate that using regular (and square) tiling usually results in an insufficient number of independent equation sets. To overcome this difficulty, other kinds of tilings are employed such as aperiodic tilings.

As previously indicated, Penrose rhombus tiling is 3-colorable, allowing the use of RGB color filter arrays on the sensor. The coloring to use and the best way to de-mosaic the image are open problems. An aspect of Penrose pixels is the irregular sampling. The acquired images are not subject to strong Moiré effects that can plague conventional digital photography, particularly in video. Additionally, Penrose rhombus tiling is only one possible aperiodic tiling, which can be selected mainly for its simplicity.

Another example of aperiodic tiling in the natural world to which super-resolution can be applied is in biological vision systems. It is well known that the acuity of many biological vision systems (including the human eye) exceeds the resolution implied by the size of their sensory cells. This phenomenon is commonly referred to as "hyper-resolution". The disclosed method can estimate the upper limit for the resolving power of biological retinal structures. This can provide an objective tool for comparing the potential visual acuity of different animals. The cell structure of a human fovea is approximately hexagonal, but definitely irregular. This structure can be modeled by a centroidal voronoi diagram. A resulting super-resolution image looks better and has lower RMS (root-mean square) error than the result of the regular pixel layout. This suggests that the retinal irregular structure theoretically has better resolving power than the regular structure.

With respect to hardware implementations, manufacturing an image sensor that uses an aperiodic pixel layout might seem implausible. In today's sensor technologies (CMOS and CCD chips), control signals and power supplies are routed to each pixel using metal wires. These wires are opaque and run on top of the silicon substrate containing the photodetectors in each pixel. On a regular grid, wires can be run between pixels to minimize their negative impact on the pixels' light gathering efficiency. However, this is not true for Penrose tiling.

Penrose pixel routing becomes much simpler when assuming a back-illuminated CMOS sensor, for example. In such devices, the chip is thinned and mounted upside down in the camera so that light enters from the back of the chip. The metal layers are now underneath the photodetectors, and do not block light. This technology is becoming more appealing as pixel physical dimensions shrink.

With no concerns about occluding pixels, Penrose pixel routing becomes much simpler. Generally, in CMOS sensors, each row of pixels shares a signal called a wordline, and each column shares a bitline. When a wordline is asserted, that row of pixels drives data (a voltage) onto the bitlines to be read out. The wiring challenge is to connect each pixel to a unique wordline/bitline combination. Power supplies and other control signals can run parallel to these wires. Slightly increasing the density of wordlines and bitlines beyond the theoretical minimum makes this task easier.

The irregular size of the photodetector itself in an image sensor with two different diamond-shaped pixels is not a problem. Additionally, microlenses with shapes that match the diamond-shaped pixels can be fabricated using melting photoresist in a similar way to hexagonal microlens array production.

Each of the two pixel shapes occur in five different orientations, so a maximum of only ten unique pixel designs would be necessary. By placing the pixels with custom software, standard integrated circuit wire routing tools can connect each pixel to the necessary wires (e.g., power supplies, a unique wordline/bitline combination, and so on) while ensuring other desirable properties such as small signal wire lengths. Thus, Penrose pixel image sensors can be produced using existing proven technologies.

Figure 3:
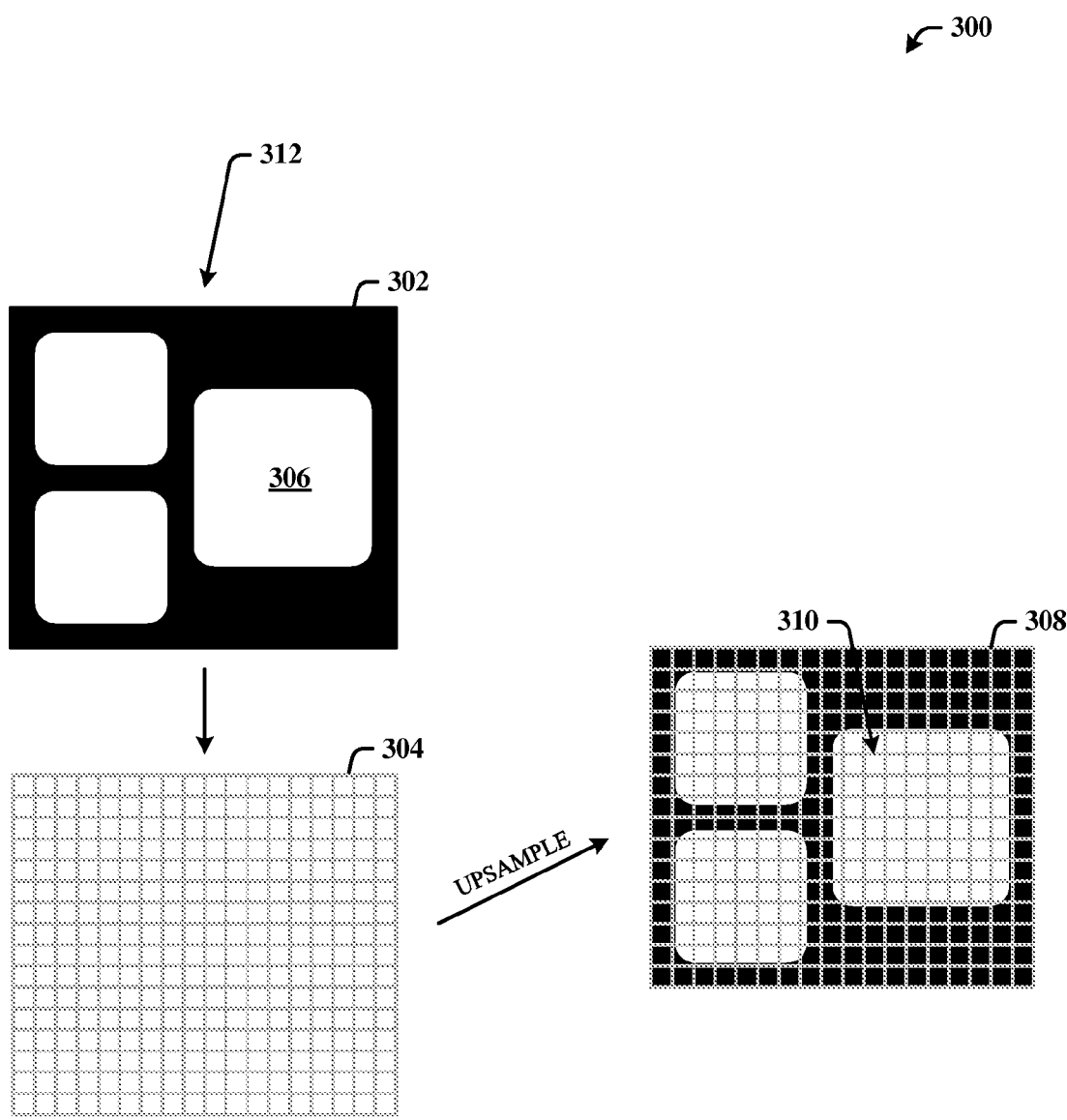
FIG. 3 illustrates an implementation of the disclosed algorithm that operates on photosensitive elements of the same shape but different sizes.

FIG. 3 illustrates a method 300 of upsampling a low-resolution image 302 using a high-resolution grid 304 on photosensitive elements 306 of the same shape but different sizes. Again, upsampling is performed to create an intermediate HRI 308 from which all computations are performed by translating the LRI 302 into high-resolution space using the high-resolution grid 304. The algorithm uses the grid 304 to cover the actual shape of the LRPs 306 (shown as the white areas), and then assigns (or maps) the value of the LRP 306 to each of the corresponding HRPs 310 that cover the LRP 306. HRPs 310 that (mostly) cover black areas (non-photosensitive areas) are assigned a null value to differentiate them from the value zero. Again, as in FIG. 2, the LRPs 306 have associated gaps 312 which are explicitly modeled by the algorithm to capture the exact pixel layout.

Note that the use of grids in FIG. 2 and FIG. 3 is just one implementation for upsampling the LRI. Alternatively, as previously indicated, the upsampling can also be formed using a constant mathematical function and integration in the downsampling.

Figure 4:
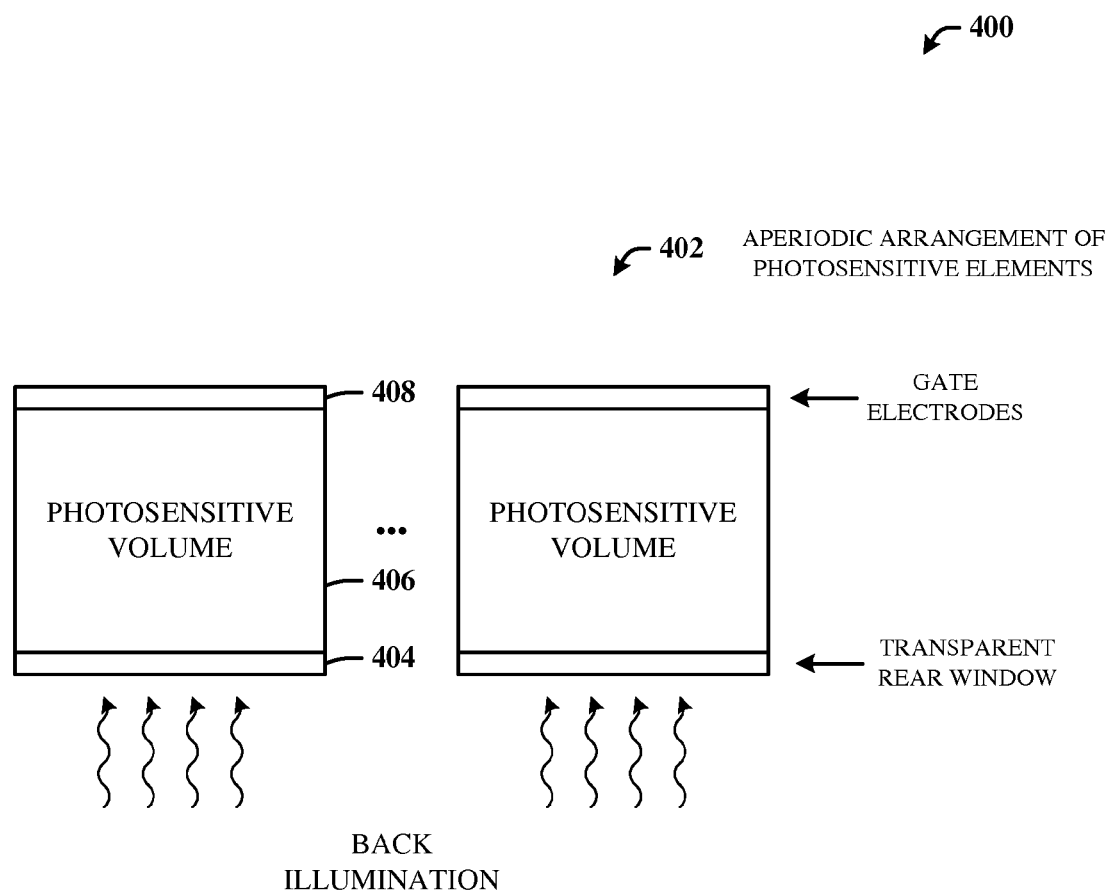
FIG. 4 illustrates a back-illumination system having an arrangement of aperiodic photosensitive elements.

FIG. 4 illustrates a back-illumination system 400 having an arrangement of aperiodic photosensitive elements. The system 400 includes multiple elements 402 fabricated with back-illumination through a transparent rear window 404, through a photosensitive volume 406 to gate electrodes (e.g., polysilicon) 408 for obtain the signal values.

Figure 5:
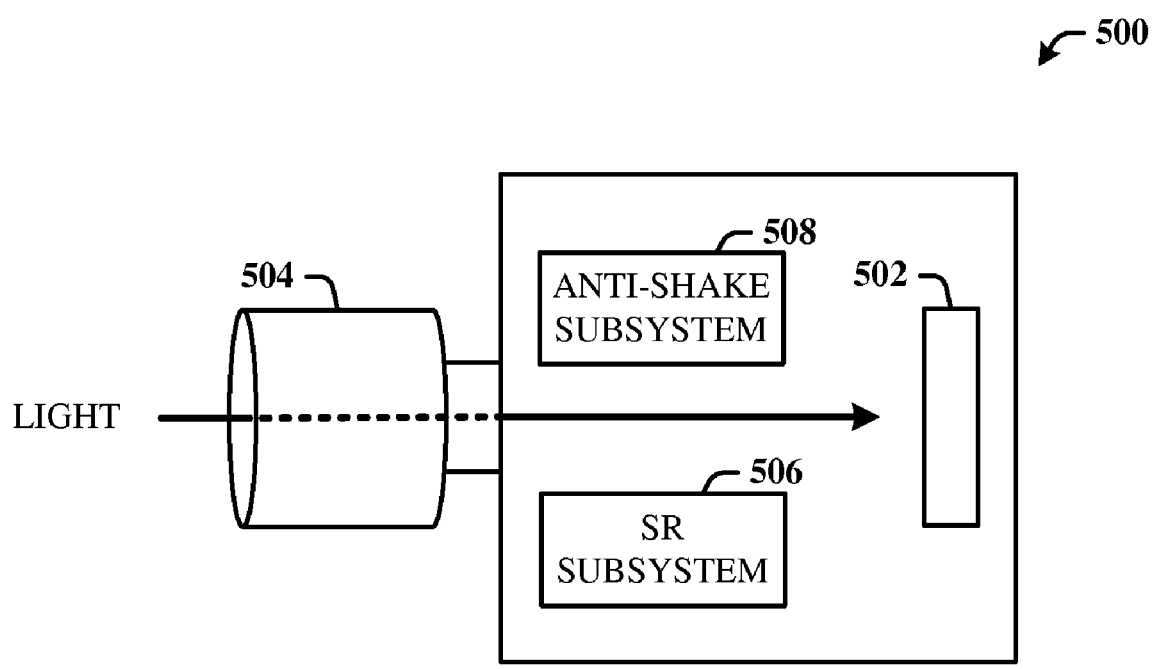
FIG. 5 illustrates a camera system that employs aperiodic pixels (e.g., Penrose) in a detector for super-resolution processing.

FIG. 5 illustrates a camera system 500 that employs aperiodic pixels (e.g., Penrose) in a detector 502 for super-resolution processing. The camera 500 receives light through a lens subsystem 504 into the detector 502. The low-resolution detector image is processed through a super-resolution subsystem 506 that employs pixel modeling, upsampling, and other processes associated with the disclosed algorithm. The camera 500 can also include an anti-shake subsystem 508 that operates to provide the best image of multiple captured images (e.g., ten). Thus, multiple LRIs are taken of an object scene, etc., and upsampled for super-resolution processing in the high-resolution space.

Figure 6:
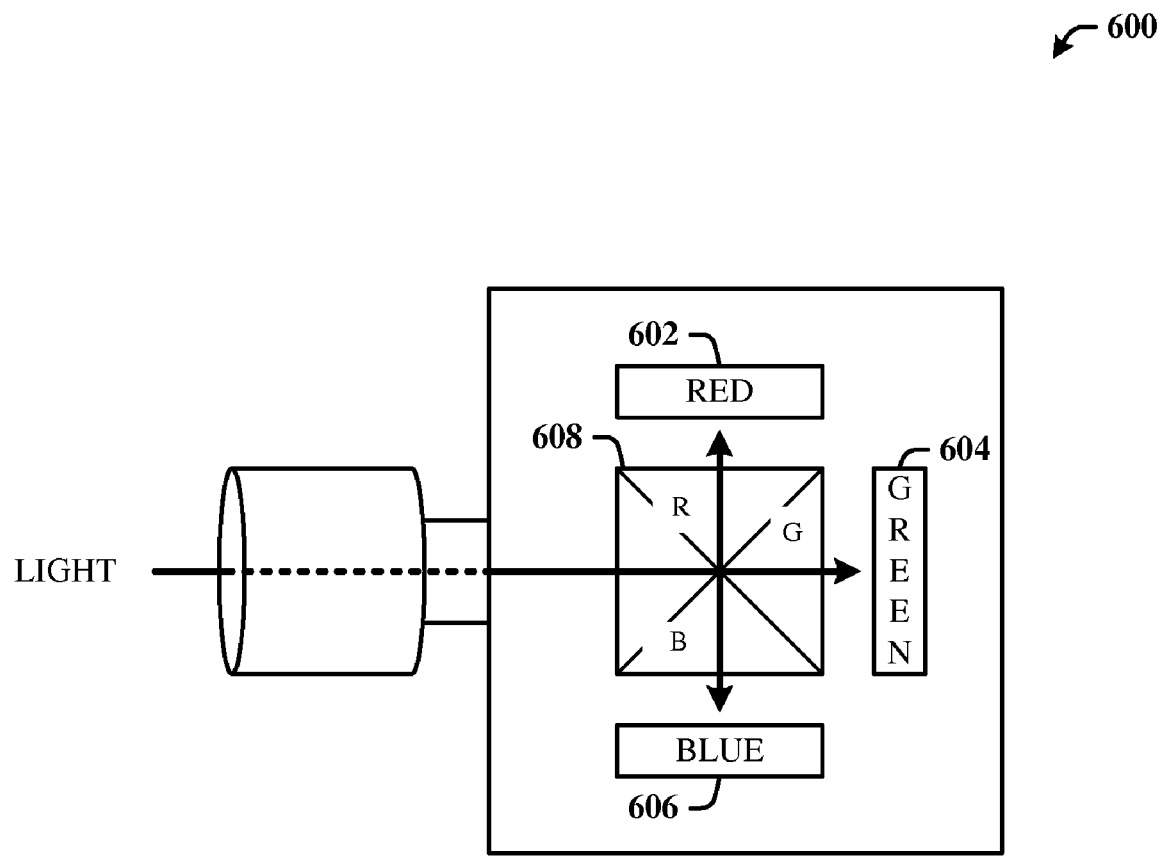
FIG. 6 illustrates a video system that employs aperiodic pixels in three detectors for super-resolution processing.

FIG. 6 illustrates a video system 600 that employs aperiodic pixels in three detectors for addressing Moiré effects. In a 3CCD example, the detector component can comprise three discrete image sensors (a red detector 602, a green detector 604, and a blue detector 606) are employed, each detector taking a separate measurement of red, green, and blue light with the color separation of the incoming light performed by a trichroic prism assembly 608, which directs the appropriate wavelength ranges of light to the respective CCDs which can have different pixel layouts. This eliminates a Moiré pattern in each aperiodic detector and in the superimposed detectors. Such an implementation can be used in projectors and camcorders, for example, and other vide-type systems.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
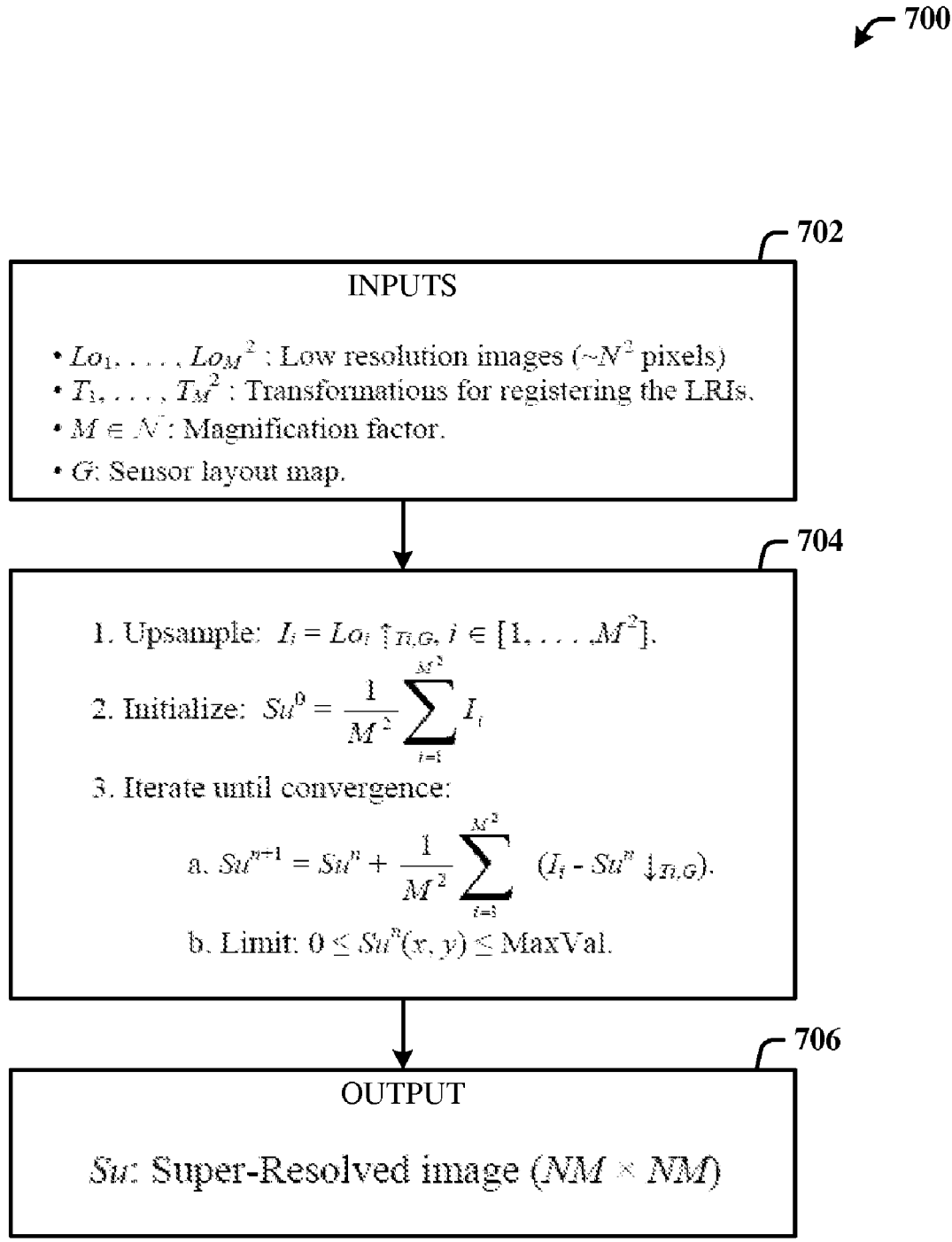
FIG. 7 illustrates the novel algorithm for image detection.

FIG. 7 illustrates the novel algorithm 700 for image detection. The algorithm 700 receives inputs 702 in the form of LRIs, transformation information for registering the LRIs, a magnification factor, and sensor layout map. The algorithm 700 performs the steps of upsampling to, initializing to take a sample of the upsampled LRIs and to arrive at an estimated intermediate HRI, and iterating (using resampling) to converge on the final super-resolved image 706, which is then output.

Figure 8:
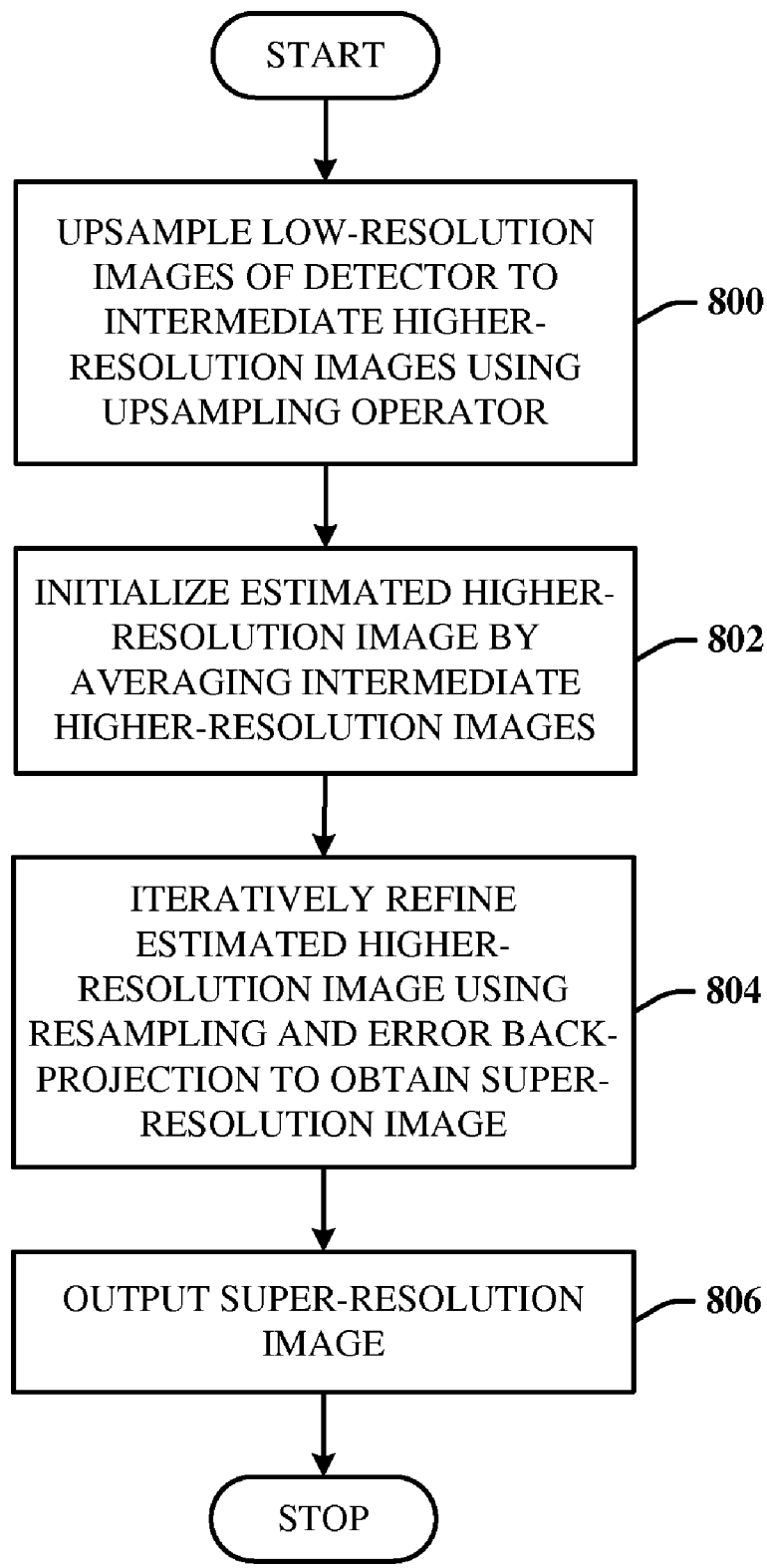
FIG. 8 illustrates a computer-implemented method of image processing.

FIG. 8 illustrates a method of detecting an image. At 800, low-resolution images of a detector are upsampled to intermediate higher-resolution images using an upsampling operator. At 802, an estimated higher-resolution image is initialized by averaging all intermediate higher-resolution images. At 804, the estimated higher-resolution image is iteratively refined using resampling and error back projection to obtain a super-resolution image. At 806, the super-resolution image is output.

Figure 9:
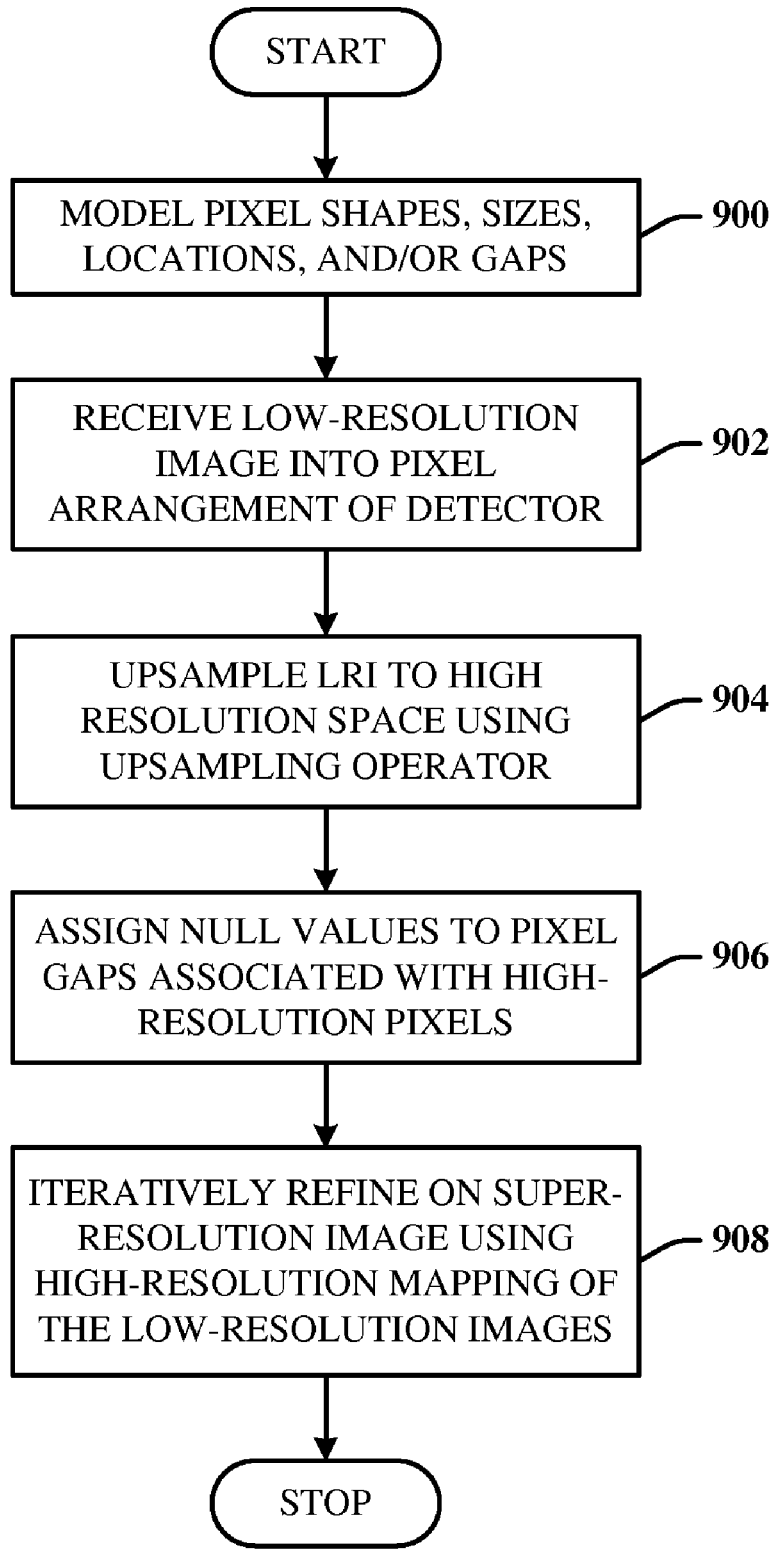
FIG. 9 illustrates an alternative method of detecting an image.

FIG. 9 illustrates an alternative method of detecting an image. At 900, the pixel shapes, size, locations, and/or gaps are explicitly modeled. At 902, a low-resolution image is received into a pixel arrangement of a detector. The arrangement can be periodic, aperiodic, or a combination thereof. At 904, the low-resolution image is upsampled to high-resolution space using an upsampling operator. At 906, null values are assigned to pixel gaps associated with high-resolution pixels. At 908, the super-resolution image is refined upon iteratively using the high-resolution mapping of the low-resolution images.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Moreover, the computer can be the camera itself, which in such a case, most of the internal components (e.g., network adapter).

Figure 10:
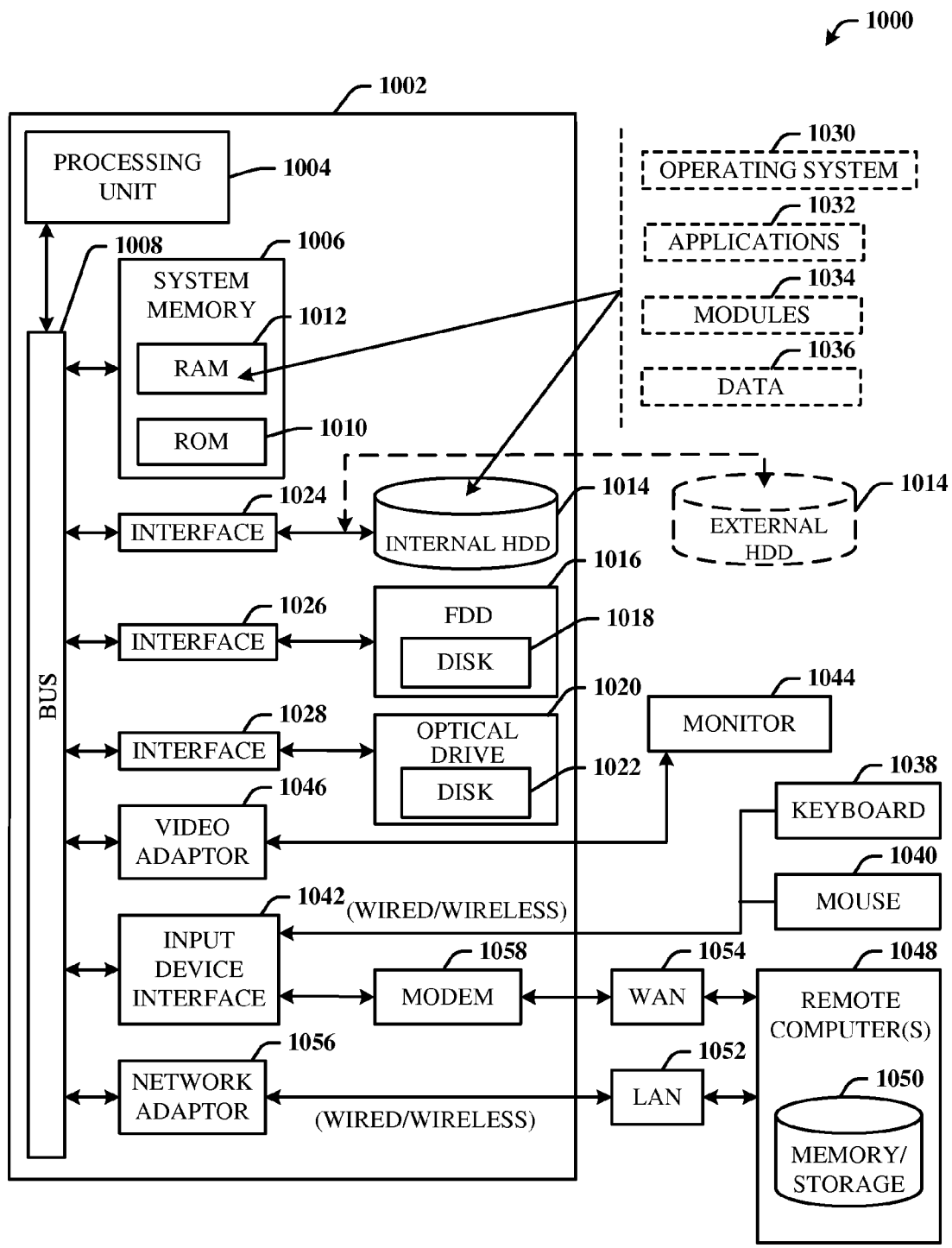
FIG. 10 illustrates a block diagram of a computing system operable to execute the super-resolution RBA in accordance with the disclosed architecture.

Referring now to FIG. 10, there is illustrated a block diagram of a computing system 1000 operable to execute the super-resolution RBA in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1012, including an operating system 1030, one or more application programs 1032, other program modules 1034 and program data 1036. The operating system 1030, one or more application programs 1032, other program modules 1034 and program data 1036 can include the processing component 106, for example. All or portions of the operating system, applications, modules, and/or data can also be cached in the RAM 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the local network 1052 through a wire and/or wireless communication network interface or adapter 1056. The adaptor 1056 may facilitate wire or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An image detection system, comprising:
 a detector component having an arrangement of photosensing elements configured for sensing an image in a first resolution, wherein each photosensing element corresponds to a pixel, and wherein the arrangement is defined by shapes and sizes of the photosensing elements, and by gaps between the photosensing elements; and
 a processing component configured for creating, based on a super-resolution process, a higher-resolution representation of the image than the first resolution based on explicit modeling of the shapes and sizes of the photosensing elements, and the gaps between the photosensing elements.

2. The system of claim 1, wherein the arrangement is aperiodic.

3. The system of claim 2, wherein the aperiodic arrangement is a Penrose tiling.

4. The system of claim 1, wherein the arrangement is periodic.

5. The system of claim 1, wherein the super-resolution process is performed entirely in high-resolution space.

6. The system of claim 1, wherein the detector component is fabricated using a back-illumination technology.

7. The system of claim 6, wherein the back-illumination technology is applied to an aperiodic tiling arrangement.

8. The system of claim 1, wherein the detector component is fabricated using one of CMOS or CCD technology.

9. The system of claim 1, wherein the processing component performs error back-projection processing in high-resolution space to iteratively recover the image.

10. The system of claim 1, wherein the super-resolution process employs a reconstruction-based algorithm.

11. A method of detecting an image, comprising:
   upsampling, by an upsampling operator implemented on a computer, low-resolution images provided by a detector resulting in a intermediate higher-resolution image;
   initializing an estimated higher-resolution image by averaging the intermediate higher-resolution images;
   iteratively refining the estimated higher-resolution image using resampling and error back-projection resulting in a super-resolution image; and
   outputting the super-resolution image.

12. The method of claim 11, wherein the detector includes one of periodic or aperiodic tiling.

13. The method of claim 11, further comprising explicitly modeling pixel shapes, sizes, locations, and spacing between the pixels.

14. The method of claim 13, further comprising preserving the pixel shapes, sizes, locations, and spacing in the higher-resolution images during upsampling of the low-resolution images.

15. The method of claim 11, further comprising resampling the estimated higher-resolution image in high-resolution space based on a resampling operator.

16. The method of claim 15, further comprising changing the resampling operator based on a corresponding change in a magnification factor of the low-resolution images.

17. The method of claim 15, wherein the resampling operator is a constant function with a support weighting equal to one at a pixel area and the resampling operator performs an integral function at the pixel area.

18. The method of claim 11, wherein resampling utilizes a resampling operator that performs an integral function at a pixel area.

19. The method of claim 11, further comprising performing a warping process after upsampling the low-resolution images.

* * * * *